(12) United States Patent
Yoshida et al.

(10) Patent No.: US 10,267,425 B2
(45) Date of Patent: Apr. 23, 2019

(54) DIAPHRAGM, FLUID CONTROL APPARATUS, AND METHOD OF MANUFACTURING DIAPHRAGM

(71) Applicant: CKD CORPORATION, Komaki-shi, Aichi (JP)

(72) Inventors: Masaki Yoshida, Komaki (JP); Michio Miyashita, Komaki (JP); Shoji Azuma, Komaki (JP); Takayuki Kumagai, Komaki (JP)

(73) Assignee: CKD Corporation, Komaki-shi (JP)

( * ) Notice: Subject to any disclaimer, the term of this patent is extended or adjusted under 35 U.S.C. 154(b) by 174 days.

(21) Appl. No.: 15/142,591

(22) Filed: Apr. 29, 2016

(65) Prior Publication Data

US 2016/0319945 A1    Nov. 3, 2016

(30) Foreign Application Priority Data

Apr. 30, 2015 (JP) ................. 2015-093352

(51) Int. Cl.
*F16K 7/17*       (2006.01)
*B29C 45/14*      (2006.01)
(Continued)

(52) U.S. Cl.
CPC ............ *F16K 7/17* (2013.01); *B29C 45/14* (2013.01); *F16K 25/005* (2013.01); *B29K 2071/00* (2013.01); *B29K 2105/20* (2013.01); *B29K 2627/18* (2013.01); *B29K 2671/00* (2013.01); *B29L 2031/755* (2013.01)

(58) Field of Classification Search
CPC . F16K 7/17; F16K 25/005; F16K 7/16; F16K 7/12; F16K 7/14; B29C 45/14; B29L 2031/755; B29K 2671/00; B29K 2071/00; B29K 2627/18; B29K 2105/20
USPC ............. 251/368, 331; 29/888.047, 890.127; 92/103 SD, 103 R
See application file for complete search history.

(56) References Cited

U.S. PATENT DOCUMENTS 3,130,954 A * 4/1964 McFarland, Jr. ....... F16K 7/126
                                                       156/244.11
3,134,571 A * 5/1964 Boteler .................. F16K 7/126
                                                       251/331

(Continued)

FOREIGN PATENT DOCUMENTS

JP    S59-122787 A    7/1984
JP    H08-189470 A    7/1996

(Continued)

OTHER PUBLICATIONS

Japanese Office Action from Japanese Application No. 2015-093352 dated Sep. 26, 2018.

*Primary Examiner* — Craig J Price
*Assistant Examiner* — Andrew J Rost
(74) *Attorney, Agent, or Firm* — Beyer Law Group LLP

(57) ABSTRACT

A diaphragm having chemical resistance is disclosed. The diaphragm includes a membrane portion and a connection portion which enables connection of the membrane portion to another member. The membrane portion is formed of a first material having chemical resistance. The connection portion is formed of a second material whose main material is the same as that of the first material. The membrane portion and the connection portion are directly bonded together.

14 Claims, 20 Drawing Sheets

(51) Int. Cl.
   *F16K 25/00*   (2006.01)
   *B29K 627/18*   (2006.01)
   *B29K 71/00*   (2006.01)
   *B29K 105/20*   (2006.01)
   *B29K 671/00*   (2006.01)
   *B29L 31/00*   (2006.01)

(56) References Cited

U.S. PATENT DOCUMENTS

| | | | |
|---|---|---|---|
| 4,720,079 A * | 1/1988 | Iizuka | B29D 99/005 251/331 |
| 5,262,068 A | 11/1993 | Bowers et al. | |
| 5,669,764 A | 9/1997 | Behringer et al. | |
| 5,743,169 A | 4/1998 | Yamada | |
| 5,758,565 A | 6/1998 | Yamada | |
| 5,902,096 A | 5/1999 | Behringer et al. | |
| 5,934,885 A | 8/1999 | Farrell et al. | |
| 6,079,959 A * | 6/2000 | Kingsford | F04B 43/0054 417/393 |
| 6,138,550 A * | 10/2000 | Fingar, Jr. | F04B 43/0054 92/103 R |
| 6,458,446 B1 * | 10/2002 | Andronaco | B29C 37/0082 428/161 |
| 6,746,637 B1 * | 6/2004 | Huss | B29C 45/16 264/135 |
| 6,755,354 B2 * | 6/2004 | Fukano | B05C 11/1026 222/571 |
| 7,389,969 B2 * | 6/2008 | Masamura | F16K 7/14 251/331 |
| 2005/0142005 A1 * | 6/2005 | Traylor | F04B 43/0054 417/394 |
| 2013/0032600 A1 | 2/2013 | Umezaki et al. | |
| 2014/0061525 A1 * | 3/2014 | Matalon | F16K 7/126 251/331 |

FOREIGN PATENT DOCUMENTS

| | | |
|---|---|---|
| JP | H08-210256 A | 8/1996 |
| JP | 2009-222189 A | 10/2009 |
| JP | 2011-247407 A | 12/2011 |
| JP | 3286687 B | 3/2015 |

\* cited by examiner

Comparative Example

Comparative Example

Comparative Example

Comparative Example

Comparative Example

Comparative Example

US 10,267,425 B2

DIAPHRAGM, FLUID CONTROL APPARATUS, AND METHOD OF MANUFACTURING DIAPHRAGM

CLAIM OF PRIORITY

This application claims priority to Japanese Patent Application No. 2015-093352 filed on Apr. 30, 2015 which is hereby incorporated by reference.

BACKGROUND OF THE INVENTION

1. Field of the Invention

The present invention relates to a diaphragm having chemical resistance, a fluid control apparatus having the diaphragm, and a method of manufacturing the diaphragm.

2. Description of the Related Art

Conventionally, a diaphragm of this type is formed of polytetrafluoroethylene (hereinafter, called "PTFE") and has a thickness of 0.2 mm to 0.4 mm (refer to Japanese Patent No. 3286687).

Meanwhile, the diaphragm may have a connection portion for connection thereof to another member. Difficulty is encountered in integrally forming the diaphragm and the connection portion by, for example, injection molding because, generally, it is difficult to form a diaphragm having a thickness of less than 0.5 mm by injection molding. Also, difficulty is encountered in bonding the connection portion to the diaphragm having a thickness of less than 0.5 mm by, for example, fusing.

SUMMARY OF THE INVENTION

An object of the present invention is to solve the above-mentioned problem in the conventional diaphragm and to provide a diaphragm which allows provision of a connection portion even if the diaphragm is thin.

To achieve the above object, a diaphragm according to the present invention comprises a membrane portion formed of a first material having chemical resistance and a connection portion enabling connection of the membrane portion to another member and formed of a second material whose main material is the same as that of the first material. The membrane portion and the connection portion are directly bonded together.

The diaphragm of the present invention comprises the membrane portion and the connection portion. The membrane portion is formed of the first material having chemical resistance. The connection portion is formed of the second material whose main material is the same as that of the first material. That is, the first material and the second material contain the same main material. Since the connection portion enables connection to another member, another member can be connected to the diaphragm through the connection portion.

Here, the first material and the second material contain the same main material. Thus, the second material can be directly bonded to the membrane portion formed of the first material by injecting the second material in a molten condition onto the membrane portion. Then, the connection portion can be formed by machining the injected second material. Therefore, even if the membrane portion is thin, the diaphragm having the connection portion can be manufactured.

BRIEF DESCRIPTION OF THE DRAWINGS

FIGS. 11A through 11C are a set of photographs of the diaphragm of Comparative Example, wherein FIG. 11A is a photograph showing a surface of the diaphragm of Comparative Example, FIG. 11B is a photograph showing, on an enlarged scale, the framed region of the photograph of FIG. 11A, and FIG. 11C is a photograph showing, on an enlarged scale, the framed region of the photograph of FIG. 11B;

FIGS. 12A and 12B are a pair of photographs of the diaphragm of the present embodiment, wherein FIG. 12A is a photograph showing a surface of the diaphragm of the present embodiment, and FIG. 12B is a photograph showing, on an enlarged scale, the framed region of the photograph of FIG. 12A;

DESCRIPTION OF THE PREFERRED EMBODIMENT

A valve according to an embodiment of the present invention for opening and closing a flow path for fluid such as a chemical liquid in, for example, a semiconductor manufacturing apparatus will next be described with reference to the drawings.

Figure 1:
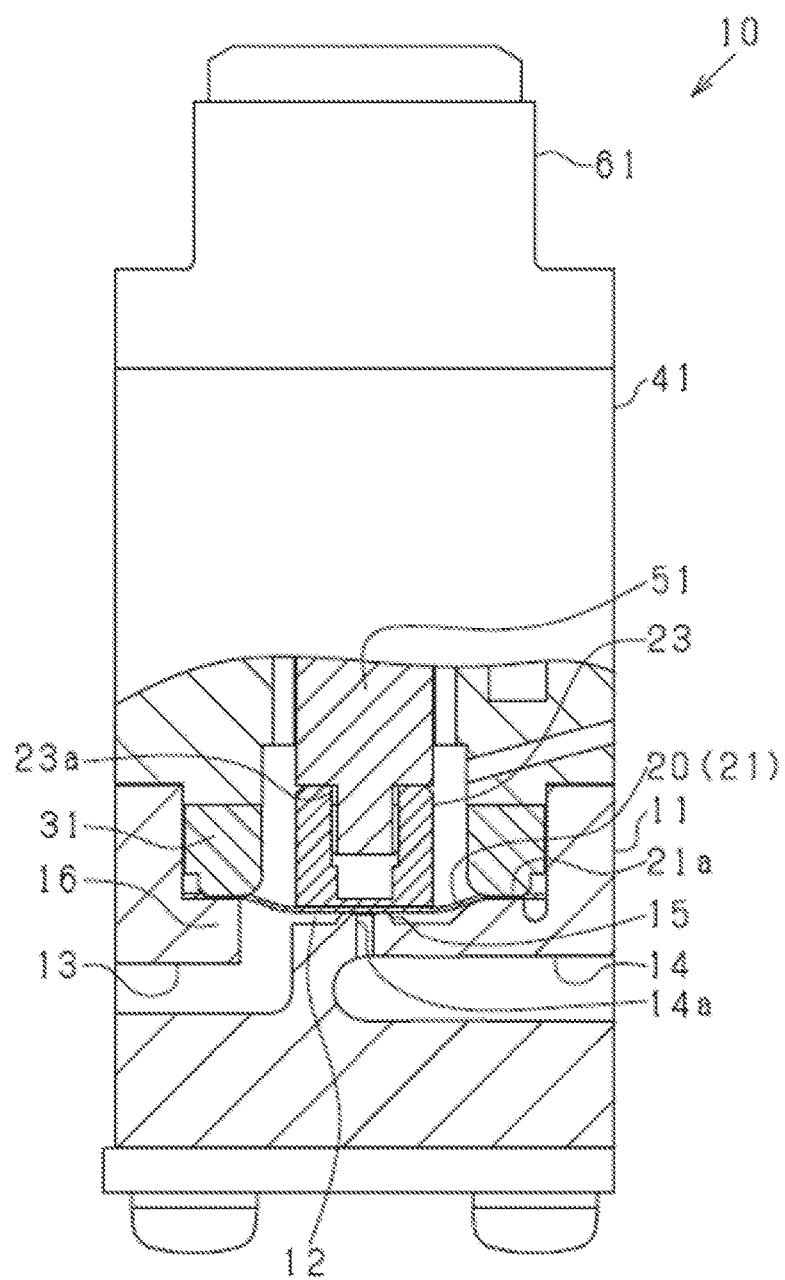
FIG. 1 is a partially sectional view showing a valve according to an embodiment of the present invention.

As shown in FIG. 1, a valve 10 (fluid control apparatus) has a valve housing 11, a diaphragm 20, a pressing member 31, a cylinder body 41, a piston 51, a cover 61, etc.

The valve housing 11 is formed from a material having high chemical resistance such as PTFE into a circular columnar shape. The housing 11 has a valve chamber 12, and a suction path 13 and a discharge path 14 which communicate with the valve chamber 12. The valve chamber 12, the suction path 13, and the discharge path 14 constitute a flow path for a chemical liquid. The valve chamber 12 (valve chest) forms a circular columnar space extending along the center axis of the housing 11. The housing 11 has an annular valve seat 15 provided around an opening 14a of the discharge path 14 which opens to the valve chamber 12. The valve seat 15 is an annular protrusion which protrudes toward the cylinder body 41 and the piston 51. An inner circumferential space of the annular protrusion partially constitutes the discharge path 14.

The diaphragm 20 is disposed to face the valve seat 15. The diaphragm 20 includes a membrane portion 21 in the form of a membrane (sheet), and a cylindrical connection portion 23. The diaphragm 20 (membrane portion 21) has a diameter of 14 mm. The connection portion 23 is bonded to the center of the membrane portion 21. The connection portion 23 has a threaded portion 23a for allowing another member to be engaged (connected) therewith. The diaphragm 20 will be described in detail later.

A circumferential edge portion 21a (predetermined portion) of the membrane portion 21 of the diaphragm 20 is pressed between the cylindrical pressing member 31 (first member), and a counter portion 16 of the housing 11 (second member) which faces the pressing member 31 with the membrane portion 21 held therebetween. Specifically, the upper surface (first surface) of the membrane portion 21 is pressed by the pressing member 31. The lower surface (second surface) of the membrane portion 21 is pressed by the counter portion 16. While the circumferential edge portion 21a of the membrane portion 21 is pressed by the pressing member 31 and the counter portion 16 as mentioned above, the housing 11 and the cylinder body 41 are connected together.

Figure 2:
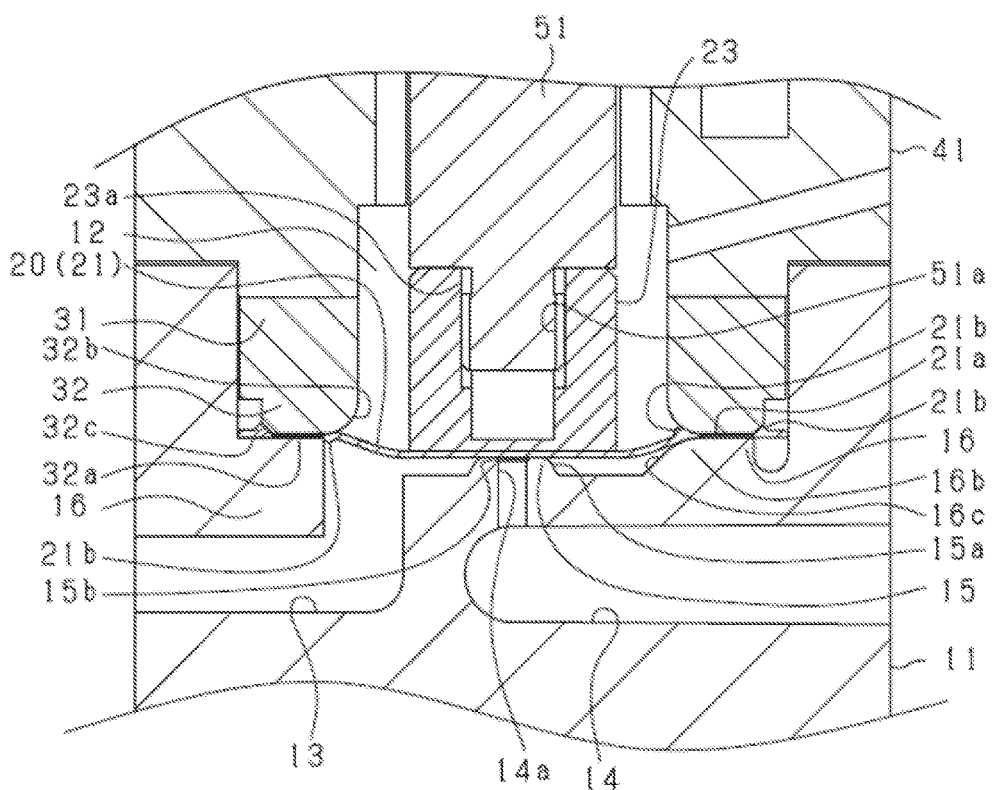
FIG. 2 is an enlarged sectional view showing a diaphragm and its periphery of the valve of FIG. 1.

FIG. 2 is an enlarged sectional view showing the diaphragm 20 and its periphery of the valve 10. The pressing member 31 has an annular protrusion 32 which is in contact with the upper surface of the diaphragm 20 and which has a flat contact surface 32a in contact with the upper surface. An inner circumferential edge 32b of the lower end of the protrusion 32 is radiused (rounded) to have a smoothly curved surface. In the annular pressing member 31, the inner circumferential edge 32b is radiused along the entire circumference thereof. In the membrane portion 21, the circumferential edge portion 21a pressed between the protrusion 32 and the counter portion 16 is deformed to a thickness approximately half the thickness (predetermined thickness) of the remaining portion of the membrane portion 21. The protrusion 32 has an inclined portion 32c formed at an outer circumferential portion of its lower end for releasing a bulge 21b which is formed around the circumferential edge portion 21a of the membrane portion 21 as a result of the deformation of the circumferential edge portion 21a.

An edge 16b of the upper end of the counter portion 16 is radiused to have a smoothly curved surface. The counter portion 16 has an inclined portion 16c formed at an inner circumferential portion of its upper end for releasing the bulge 21b which is formed around a pressed portion (predetermined portion) of the circumferential edge portion 21a of the membrane portion 21 as a result of the deformation of the circumferential edge portion 21a.

In the valve seat 15, an outer circumferential edge 15a of a portion in contact with the diaphragm 20 is radiused to have a smoothly curved surface. In the annular valve seat 15, the entire outer circumferential edge 15a is radiused. In the valve seat 15, an inner circumferential edge 15b of the portion in contact with the diaphragm 20 is radiused to have a smoothly curved surface. In the annular valve seat 15, the entire inner circumferential edge 15b is radiused.

A lower end portion of the piston 51 is connected to the connection portion 23 of the diaphragm 20. The piston 51 (reciprocating member) is formed into a circular columnar shape. The lower end portion of the piston 51 has a threaded portion 51a formed thereon. The threaded portion 51a of the piston 51 is engaged with the threaded portion 23a of the connection portion 23 of the diaphragm 20, whereby the diaphragm 20 and the piston 51 are connected together.

An actuator (not shown) for reciprocating the piston 51 toward the valve seat 15 is incorporated into the cylinder body 41. The actuator may reciprocate the piston 51 by means of, for example, electromagnetic force or pneumatic force.

The diaphragm 20 is deformed through reciprocation of the piston 51. By means of the diaphragm 20 coming into contact with the valve seat 15, communication between the valve chamber 12 and the discharge path 14 is shut off. By means of the diaphragm 20 moving away from the valve seat 15, communication is established between the valve chamber 12 and the discharge path 14.

In the case where the diaphragm having the connection portion is formed from PTFE or PFA by, for example, injection molding as practiced conventionally, generally, the membrane portion fails to be formed sufficiently thin. Accordingly, in the case of a diaphragm having a diameter of 14 mm, the maximum amount of deformation (stroke) is generally about 1 mm. By contrast, in the case of the diaphragm 20, the membrane portion 21 has a thickness of about 0.2 mm, and the maximum amount of deformation of the diaphragm 20 is 4 mm. Thus, the ratio between the amount of deformation of the diaphragm 20 and the diameter of the diaphragm 20 (amount of deformation/diameter) is set to 0.10 to 0.25. The actuator and the piston 51 constitutes a drive section which drives the diaphragm 20 to deform the diaphragm 20.

Figure 3:
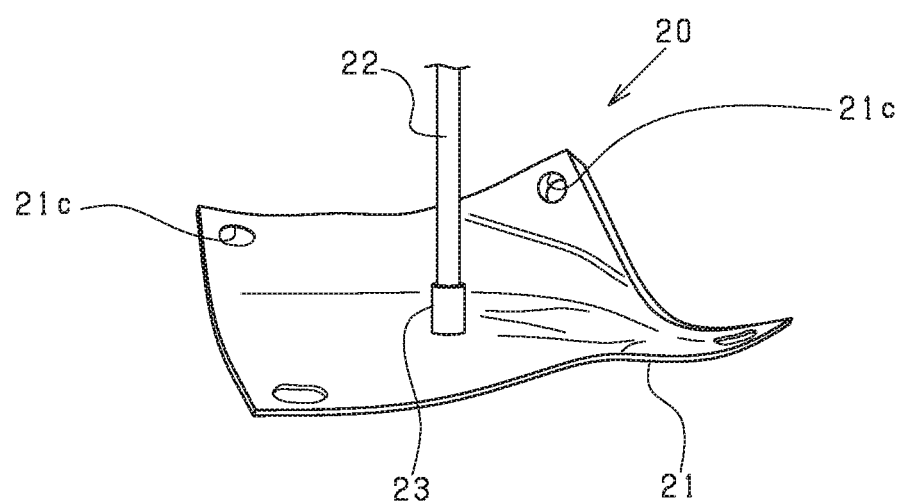
FIG. 3 is a photograph showing the diaphragm having a columnar portion.

Next, the diaphragm 20 of the present embodiment will be described in detail. FIG. 3 is a photograph showing the diaphragm 20 having a columnar portion 22.

The membrane portion 21 is formed of a first material whose main material is a copolymer of tetrafluoroethylene and perfluoroalkyl vinyl ether (PFA). PFA has chemical resistance and has a molecular structure such that particles are unlikely to be generated as compared with PTFE. The membrane portion 21 is sheet (membrane) having a predetermined uniform thickness. The predetermined thickness is 0.05 mm to 0.5 mm, desirably about 0.2 mm. The membrane portion 21 is formed by rolling the first material.

Figure 4:
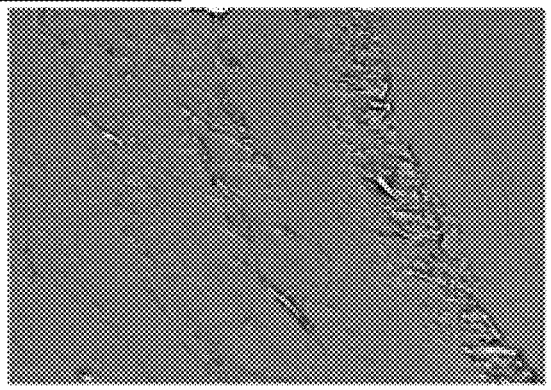
FIG. 4 is a photograph showing the surface of a diaphragm of Comparative Example formed by machining.

FIG. 4 is a photograph showing the surface of a diaphragm of Comparative Example formed by machining. As shown in FIG. 4, the surface of the diaphragm of Comparative Example is rough due to machining. Thus, in use of the diaphragm, particles may possibly be generated, or a portion of the surface may possibly be torn off (come off).

Figure 5:
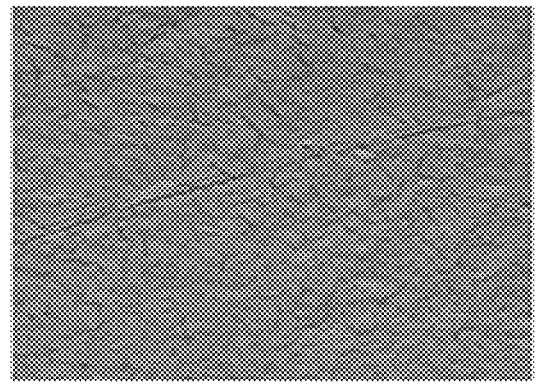
FIG. 5 is a photograph showing the surface of a diaphragm of the present embodiment formed by rolling.

FIG. 5 is a photograph showing the surface of the diaphragm 20 of the present embodiment formed by rolling. As shown in FIG. 5, since the surface of the diaphragm 20; specifically, the surface of the membrane portion 21, is not machined, the surface is not rough, in contrast to the surface of the diaphragm of Comparative Example. Further, since the surface of the membrane portion 21 is pressed by rolling, the surface is smoothed. Thus, in use of the diaphragm 20, the generation of particles and the tearing off of a portion of the surface can be restrained.

Referring back to FIG. 3, the columnar portion 22 is directly bonded to the center of the membrane portion 21. The columnar portion 22 is formed into a circular columnar shape from a second material whose main material is PFA. The first material is higher in flexibility than the second material. The membrane portion 21 has positioning through holes 21c formed at its four corners.

The columnar portion 22 is formed into the connection portion 23 by cutting and machining. Thus, the connection portion 23 is directly bonded to the center of the membrane portion 21. The threaded portion 23a is formed on the connection portion 23. In this manner, the diaphragm 20 is manufactured.

Figure 6:
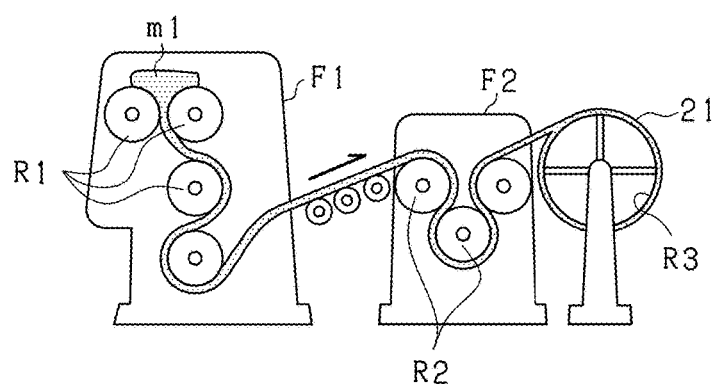
FIG. 6 is a schematic view showing a method of manufacturing a membrane portion of the diaphragm.
Figure 7:
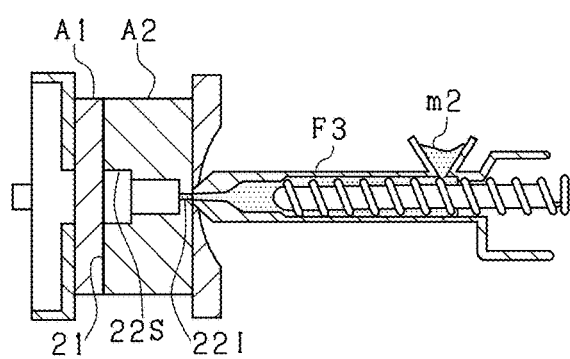
FIG. 7 is a schematic view showing a step of injecting a second material onto the membrane portion for forming a columnar portion.

Next, a method of manufacturing the diaphragm 20 will be described in detail. FIG. 6 is a schematic view showing a method of manufacturing the membrane portion 21 of the diaphragm 20. FIG. 7 is a schematic view showing a step of injecting the second material onto the membrane portion 21 for forming the columnar portion 22.

First, as shown in FIG. 6, a first material m1 in a molten condition is charged into a rolling machine F1. The molten first material m1 is low in fluidity and thus cannot undergo injection molding. Meanwhile, the first material m1 is high in flexibility. Thus, the first material m1 is extruded while being rolled by means of rollers R1 of the rolling machine F1. At this time, the rollers R1 are heated for rolling the first material m1 in a heated condition. The first material m1 is softened through application of heat and is rolled to be gradually thinned.

Next, the first material m1 rolled to a certain extent is sent to a rolling machine F2. The rolling machine F2 further rolls the first material m1 by means of rollers R2. At this time, the rollers R2 are heated for rolling the first material m1 in a heated condition. Then, the membrane portion 21 in the form of a membrane (sheet) rolled to a thickness of 0.2 mm is wound onto a roller R3. Thus, the membrane portion 21 in roll-form is completed.

Generally, difficulty is encountered in rolling the first material m1 having chemical resistance to a thickness of less than 0.05 mm. Thus, the membrane portion 21 having a thickness of 0.05 mm to 0.5 mm is formed by rolling the first material m1. In the present embodiment, the membrane portion 21 having a thickness of about 0.2 mm is formed.

Next, as shown in FIG. 7, the membrane portion 21 formed by cutting to a predetermined size is attached to a mold A1. Then, a mold A2 for the columnar portion 22 is disposed on the surface of the membrane portion 21. The mold A2 has a cavity 22S corresponding to the columnar portion 22. The cavity 22S is closed up by sandwiching the membrane portion 21 between the mold A1 and the mold A2. The cavity 22S communicates with a material inlet 22I. The inlet 22I is connected to an injection molding machine F3.

A molten second material m2 is charged into the injection molding machine F3. The molten second material m2 is high in fluidity and thus allows injection molding. That is, the molten second material m2 is higher in fluidity than the molten first material m1. Then, the molten second material m2 is injected onto the surface of the membrane portion 21 formed of the first material m1.

Meanwhile, despite the molten second material m2 coming into contact with the membrane portion 21, the membrane portion 21 formed of the first material m1 does not melt. The membrane portion 21 does not melt, but is heated by the injected second material m2, whereby the movement of molecules of the membrane portion 21 is accelerated.

Subsequently, the molds A1 and A2 are cooled, thereby solidifying the injected second material m2 to thereby form the columnar portion 22. Thus, as shown in FIG. 3, the membrane portion 21 and the columnar portion 22 are directly bonded together. Then, the columnar portion 22 is machined to form the connection portion 23 which allows connection to another member. Thus, the diaphragm 20 is manufacture d.

Figure 8:
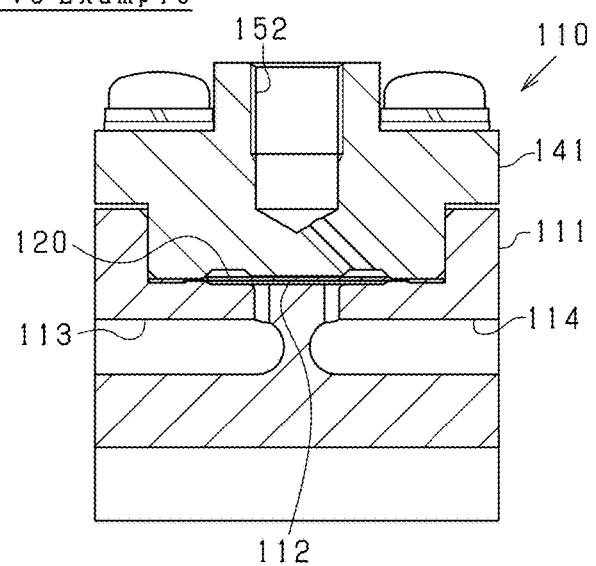
FIG. 8 is a sectional view showing a valve of Comparative Example.
Figure 9:
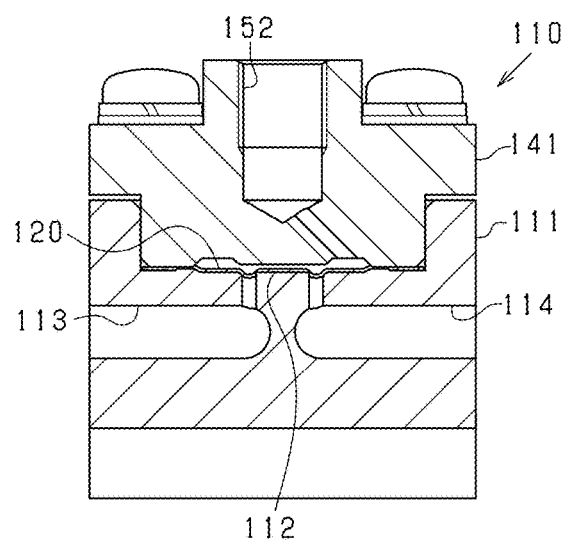
FIG. 9 is a sectional view showing an operation of the valve of FIG. 8.

FIG. 8 is a sectional view showing a valve 110 of Comparative Example. FIG. 9 is a sectional view showing an operation of the valve 110 of FIG. 8. In the valve 110 of Comparative Example shown in FIGS. 8 and 9, members corresponding to those of the valve 10 of the present embodiment are denoted by reference numerals produced by adding "100" to those of the valve 10.

In the valve 110, a body 141 has an inlet-outlet path 152 for air (compressed air) in place of the piston 51 of the valve 10. The inlet-outlet path 152 communicates with an upper space of a valve chamber 112 located above a diaphragm 120; i.e., a space opposite a suction path 113 and a discharge path 114. The diaphragm 20 is a membrane (sheet) formed of the first material mentioned above.

When air is introduced through the inlet-outlet path 152, as shown in FIG. 9, the diaphragm 120 is deformed toward the suction path 113 and the discharge path 114 (toward a valve housing 111) to thereby shut off the suction path 113 and the discharge path 114 from the valve chamber 112. When air is discharged through the inlet-outlet path 152, as shown in FIG. 8, the diaphragm 20 is deformed toward a side opposite the suction path 113 and the discharge path 114 (toward the body 141) to thereby establish communication between the suction path 113 and the valve chamber 112 and between the discharge path 114 and the valve chamber 112.

Figure 10:
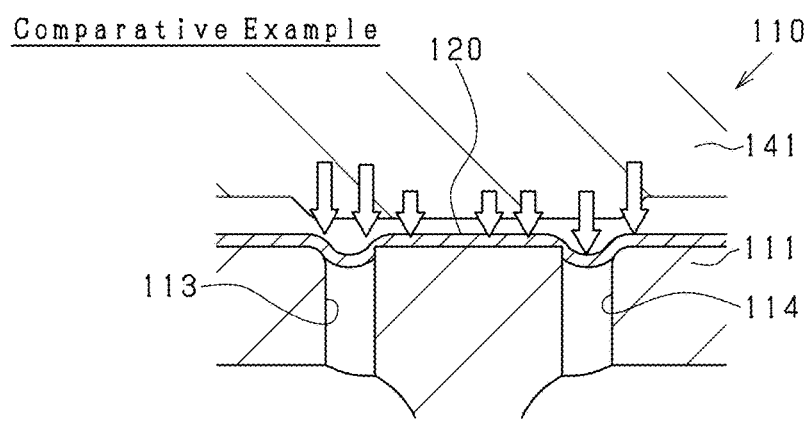
FIG. 10 is an enlarged sectional view showing the diaphragm and its periphery of the valve of FIG. 9.

FIG. 10 is an enlarged sectional view showing the diaphragm 120 and its periphery of the valve 110 of FIG. 9. FIG. 10 shows a state in which air is introduced through the inlet-outlet path 152 to thereby shut off the suction path 113 and the discharge path 114 from the valve chamber 112 by means of the diaphragm 120. In this state, a portion of the diaphragm 120 projects into the suction path 113 and into the discharge path 114. Also, since a central portion of the diaphragm 120 is not restricted, the diaphragm 120 can relatively freely move in a planar direction of the membrane. Thus, the surface of the diaphragm 120 and the contact surface (upper surface) of the valve housing 111 rub against each other.

Figure 11A:
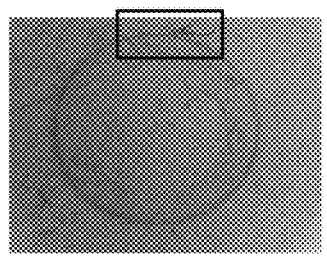
Figure 11B:
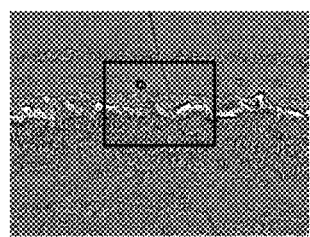
Figure 11C:

FIGS. 11A through 11C are a set of photographs of the diaphragm of Comparative Example, wherein FIG. 11A is a photograph showing a surface of the diaphragm of Comparative Example, FIG. 11B is a photograph showing, on an enlarged scale, the framed region of the photograph of FIG. 11A, and FIG. 11C is a photograph showing, on an enlarged scale, the framed region of the photograph of FIG. 11B. As shown in the photographs, the surface of the diaphragm 120 is marked with rubbing. As shown in the enlarged photograph of the rubbed mark, the surface of the diaphragm 120 is roughened. Thus, as a result of the surface of the diaphragm 120 and the contact surface of the valve housing 111 rubbing against each other, particles are generated from the diaphragm 120.

Figure 12A:
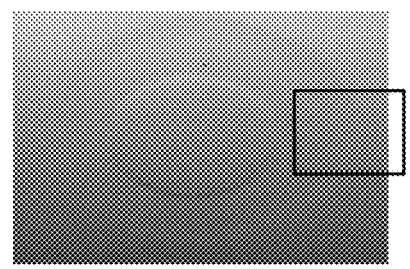
Figure 12B:
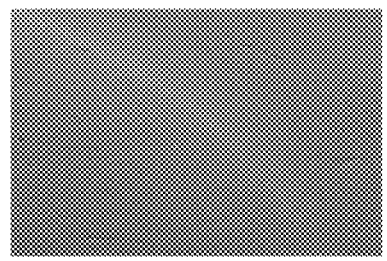

FIGS. 12A and 12B are a pair of photographs of the diaphragm of the present embodiment, wherein FIG. 12A is a photograph showing a surface of the diaphragm of the present embodiment, and FIG. 12B is a photograph showing, on an enlarged scale, the framed region of the photograph of FIG. 12A. As shown in the photograph of FIG. 12A, the surface of the diaphragm 20 is marked with pressing. However, in the valve 10, since a central portion of the diaphragm 20 is restricted by means of the piston 51 through the connection portion 23, the movement of the diaphragm 20 in a planar direction (radial direction) of the membrane is restrained. Thus, the surface of the diaphragm 20 and the valve seat 15 hardly rub against each other. As shown in the photograph of FIG. 12B showing the pressed mark on an enlarged scale, the surface of the diaphragm 20 is not roughened.

Figure 13:
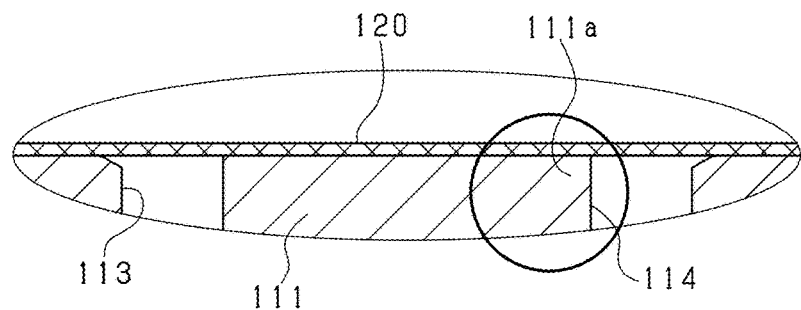
FIG. 13 is an enlarged sectional view showing the diaphragm and its periphery of the valve of Comparative Example.

FIG. 13 is an enlarged sectional view showing the diaphragm 120 and its periphery of the valve 110 of Comparative Example. As marked with a circle in FIG. 13, the diaphragm 120 is in contact with an edge 111a of the contact surface (upper surface) of the valve housing 111. Thus, the surface of the diaphragm 120 may possibly be damaged.

Figure 14:
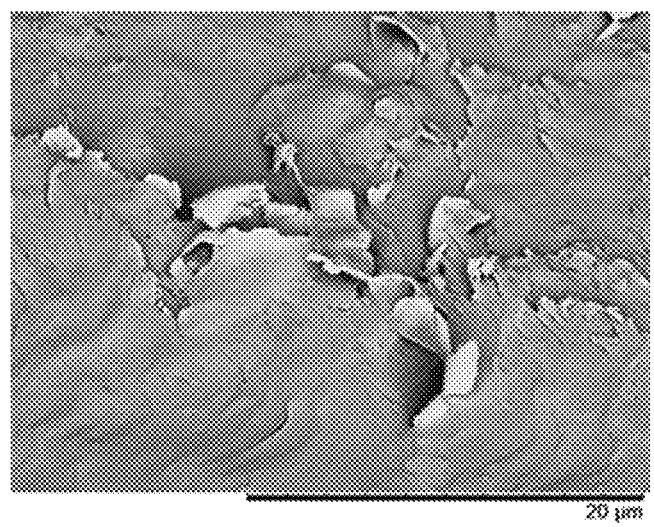
FIG. 14 is an enlarged photograph showing a surface of the diaphragm of FIG. 13.

FIG. 14 is an enlarged photograph showing the surface of a portion of the diaphragm 120 of FIG. 13 in contact with the edge 111a. As shown in FIG. 14, the surface of the diaphragm 120 is scraped by the edge 111a. Thus, the contact of the diaphragm 120 with the edge 111a the contact surface of the valve housing 111 causes the generation of particles.

Figure 15:
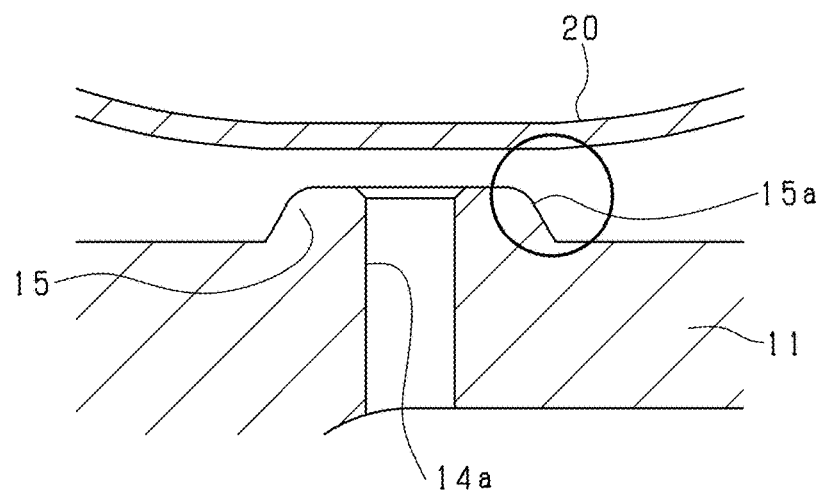
FIG. 15 is an enlarged view showing a valve seat and its periphery of the valve of the present embodiment.

FIG. 15 is an enlarged sectional view showing the valve seat 15 and its periphery of the valve 10 of the present embodiment. FIG. 15 omits illustration of the connection portion 23 of the diaphragm 20. As marked with a circle in FIG. 15, the diaphragm 20 is in contact with the round edge 15a of the valve seat 15. Thus, damage to the surface of the diaphragm 20 is restrained.

Figure 16:
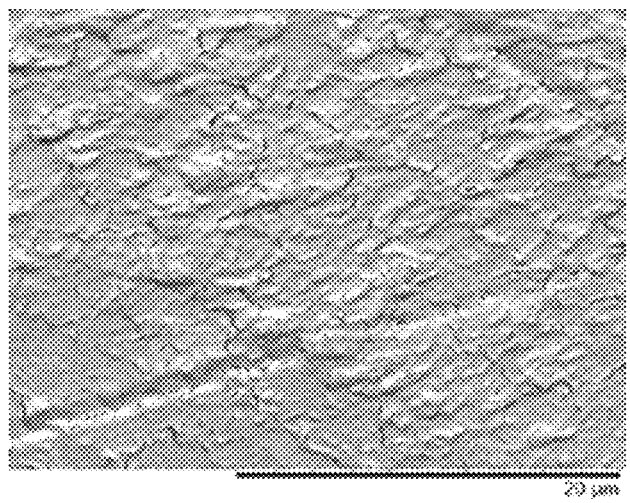
FIG. 16 is an enlarged photograph showing a surface of the diaphragm of FIG. 15.

FIG. 16 is an enlarged photograph showing the surface of a portion of the diaphragm 20 of FIG. 15 in contact with the edge 15a. As shown in FIG. 16, the surface of the diaphragm 20 is not scraped by the edge 15a. Thus, the generation of particles from the diaphragm 20 is restrained.

The present embodiment described above in detail has the following advantages.

The first material m1 and the second material m2 contain the same main material. Thus, by means of the molten second material m2 being injected onto the membrane portion 21 formed of the first material m1, the second material m2 can be directly bonded to the membrane portion 21. Then, the injected second material m2 undergoes machining to thereby form the connection portion 23. Thus, even if the membrane portion 21 is thin, the diaphragm 20 having the connection portion 23 can be manufactured.

The molten second material m2 is higher in fluidity than the molten first material m1. Thus, even in the case where the molten first material m1 cannot undergo injection molding, by means of the second material m2 being melted and subjected to injection molding, the second material m2 can be bonded to the membrane portion 21 to thereby form the connection portion 23.

The molten second material m2 has such fluidity as to allow injection molding. Thus, by means of the molten second material m2 being subjected to injection molding to come into contact with the membrane portion 21, the connection portion 23 bonded directly to the membrane portion 21 can be formed.

Since the first material m1 is higher in flexibility than the second material m2, high strength can be imparted to the membrane portion 21 formed of the first material m1, whereby the generation of particles from the membrane portion 21 and damage to the membrane portion 21 can be restrained.

The main materials of the first and second materials m1 and m2 are a copolymer of tetrafluoroethylene and perfluoroalkyl vinyl ether (PFA). PFA has a molecular structure such that particles are unlikely to be generated as compared with PTFE; thus, in use of the diaphragm 20, the generation of particles can be restrained. In recent years, because of development of PFA having such high fluidity in a molten condition as to allow injection molding, by use of the PFA having high fluidity in a molten condition as the second material m2, the connection portion 23 can be formed by injection-molding the molten PFA. Also, in recent years, because of development of soft PFA, by use of the soft PFA as the first material m1, the membrane portion 21 can be formed by rolling the soft PFA.

Generally, difficulty is encountered in rolling the first material m1 having chemical resistance to a thickness of less than 0.05 mm. Also, difficulty is encountered in forming the membrane portion 21 having a thickness of less than 0.5 mm by injection molding. By means of rolling the first material m1 to thereby form the membrane portion 21 having a thickness of 0.05 mm to 0.5 mm, and by means of injection-molding the second material m2, the diaphragm 20 having the connection portion 23 can be manufactured.

Since the membrane portion 21 has a thickness of about 0.2 mm, the diaphragm 20 composed of the membrane portion 21 and the connection portion 23 can have proper flexure and strength.

Since the surface of the membrane portion 21 is pressed to thereby be smoothed, the generation of particles from the membrane portion 21 can be restrained. Specifically, since the membrane portion 21 is formed by rolling the first material m1, there can be manufactured the membrane portion 21 whose surface is smoothed by pressing.

The diaphragm 20 can be such that its membrane portion 21 is rendered thin while having the connection portion 23. Thus, durability of the diaphragm 20 against deformation can be improved, and the diaphragm 20 can have a relatively large amount of deformation in relation to the diameter thereof. As a result, there can be implemented the valve 10 having a ratio (amount of deformation/diameter) of 0.15 to 0.25 between the amount of deformation of the diaphragm 20 and the diameter of the diaphragm 20.

Since the membrane portion 21 is sheet having a predetermined uniform thickness, the membrane portion 21 can be formed by rolling. The pressing member 31 which presses the upper surface of the membrane portion 21 has the protrusion 32 whose contact surface 32a in contact with the upper surface is flat. Thus, the protrusion 32 having the flat contact surface 32a can press the upper surface of the membrane portion 21, whereby damage to the membrane portion 21 can be restrained.

The cylinder body 41 has the counter portion 16 which faces the protrusion 32 of the pressing member 31 with the membrane portion 21 held therebetween. In the membrane portion 21, a predetermined portion of the circumferential edge portion 21a pressed between the protrusion 32 and the counter portion 16 is deformed to a thickness approximately half a predetermined thickness. Thus, even if the membrane portion 21 is sheet having a predetermined uniform thickness, the membrane portion 21 can reliably provide a seal between the pressing member 31 and the cylinder body 41. Further, the counter portion 16 has the inclined portion 16c for releasing the bulge 21b which is formed around the predetermined portion of the circumferential edge portion 21a as a result of the deformation of the predetermined portion. Thus, there can be restrained excessive imposition of load on the predetermined portion of the circumferential edge portion 21a pressed between the protrusion 32 and the counter portion 16, whereby damage to the membrane portion 21 can be restrained.

In the valve 10, the actuator has the piston 51 which is connected to the connection portion 23 and is reciprocated. Thus, by means of reciprocating the piston 51, the diaphragm 20 can be deformed. As compared with a structure in which the diaphragm 20 is deformed by, for example, pneumatic means, a structure in which the diaphragm 20 is deformed by means of the piston 51 can restrain radial movement of the diaphragm 20. As a result, the rubbing of the membrane portion 21 in opening/closing the discharge path 14 for a chemical liquid can be restrained, so that the generation of particles from the membrane portion 21 and damage to the membrane portion 21 can be restrained.

The annular valve seat 15 is provided around the opening 14a of the discharge path 14 which opens to the valve chamber 12, and the edge 15a of its portion in contact with the diaphragm 20 is smoothly curved. Thus, despite contact between the valve seat 15 and the diaphragm 20 being repeated, the generation of particles from the membrane portion 21 and damage to the membrane portion 21 can be restrained.

In the method of manufacturing the diaphragm 20, the molten second material m2 whose main material is the same as that of the first material m1 having chemical resistance is injected onto the surface of the membrane portion 21 formed of the first material m1. Since the main material of the first material m1 is the same as that of the second material m2, the second material m2 can be directly bonded to the membrane portion 21.

The injected second material m2 is solidified to thereby form the columnar portion 22. Thus, by means of machining the columnar portion 22, the connection portion 23 can be formed. Thus, even if the membrane portion 21 is thin, the diaphragm 20 having the connection portion 23 can be manufactured.

In the step of injecting the second material m2, while the mold A2 for the columnar portion 22 is disposed on the surface of the membrane portion 21, the second material m2 in a molten condition is injected into the mold A2. Thus, the injected second material m2 can be brought into contact with the membrane portion 21, whereby the columnar portion 22 bonded directly to the membrane portion 21 can be formed.

In the step of injecting the second material m2, the second material m2 in a molten condition is injected onto the membrane portion 21. Thus, the injected second material m2 heats the membrane portion 21 to thereby accelerate movement of molecules in the membrane portion 21, whereby the bonding strength between the membrane portion 21 and the second material m2 can be improved.

The membrane portion 21 is formed by means of rolling the first material m1 in a heated condition. Thus, in forming the membrane portion 21 by rolling, the first material m1 can be softened, whereby workability of the first material m1 can be improved.

The embodiment described above can be modified as follows.

The inclined portion 16c can be eliminated from the counter portion 16.

In the above embodiment, the circumferential edge portion 21a of the membrane portion 21 is deformed to approximately half a predetermined thickness. However, the present invention is not limited thereto. The circumferential edge portion 21a may be deformed to approximately two-thirds or one-third of the predetermined thickness.

In the pressing member 31, the contact surface 32a of the protrusion 32 may be convexly curved downward.

The ratio between the amount of deformation of the diaphragm 20 and the diameter of the diaphragm 20 (amount of deformation/diameter) can be set to a value which falls outside the range of 0.15 to 0.25.

The first material and the second material can use, as a main material, a material other than PFA so long as the first material has a flexibility, and the second material can be injection-molded. Also, the main material is not limited to a single material, but the main material can contain two or three materials.

The position of bonding between the membrane portion 21 and the connection portion 23 is not limited to the center of the membrane portion 21, but can be modified as appropriate.

The shapes of the membrane portion 21 and the connection portion 23 can be determined arbitrarily depending on applications.

The first material m1 may not be heated during rolling so long as workability of the first material m1 is ensured.

The diaphragm 20 can have a structure such that the columnar portion 22 is used intact as the connection portion 23 rather than machined to form the connection portion 23. In this case, the columnar portion 22 becomes the connection portion 23 without any change.

In order to improve the strength of bonding between the membrane portion 21 and the second material m2 (columnar portion 22), in the step of injecting the second material m2, the membrane portion 21 can be heated.

Figure 17:
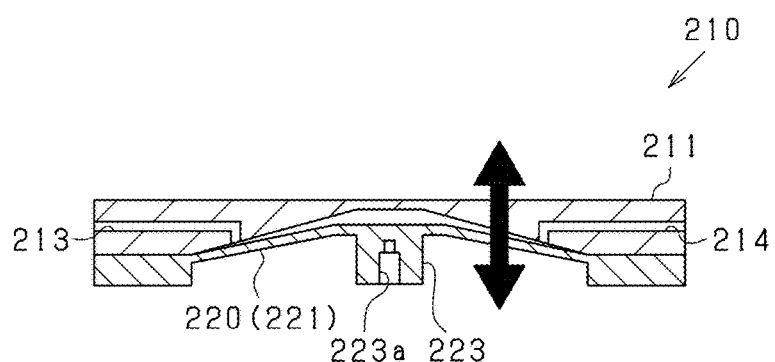
FIG. 17 is an enlarged sectional view showing an example of application of a diaphragm to a pump.

In the above embodiment, the diaphragm 20 is applied to the valve 10. However, as shown in FIG. 17, a diaphragm 220 corresponding to the diaphragm 20 can be applied to a pump 210. FIG. 17 shows only a portion of the pump 210. As shown in FIG. 17, a body 211 of the pump 210 has a fluid suction path 213 and a fluid discharge path 214 formed therein. In response to deformation of the diaphragm 220, fluid is taken in through the suction path 213 and is discharged through the discharge path 214.

The diaphragm 220 includes a membrane portion 221 similar to the membrane portion 21 of the above embodiment and a connection portion 223 corresponding to the connection portion 23 of the above embodiment. The connection portion 223 has a recess 223a to which a magnet (another member) is connected (attached). The magnet is attached to the recess 223a. In the pump 210, the amount of deformation of the diaphragm 220 is detected by means of, for example, detecting magnetic flux of the magnet attached to the connection portion 223. Even such a diaphragm 220 can yield actions and effects similar to those yielded by the diaphragm 20 of the above embodiment.

What is claimed is:

1. A method of manufacturing a diaphragm having a membrane and a connection portion attached thereto, the method comprising:
   forming the membrane by rolling a first material into a predetermined thickness, the first material having chemical resistance;
   disposing a mold for forming a columnar shape on the surface of the membrane;
   injecting a second material in a molten state into the mold, the second material having material properties different from that of the first material, while a main material component of the second material being the same as that of the first material; and
   solidifying the injected second material thereby forming the connection portion in the columnar shape directly bonded to the surface of the membrane.

2. The method according to claim 1, wherein the main material component is a copolymer of tetrafluoroethylene and perfluoroalkyl vinyl ether.

3. The method according to claim 1, wherein the first material has a flexibility higher than that of the second material.

4. A method of manufacturing a diaphragm having a membrane and a connection portion attached thereto, the method comprising:
   forming the membrane by rolling a first material into a predetermine thickness, the first material having chemical resistance, the first material having first material properties including a first fluidity in a first molten state thereof;

forming a connection portion in a columnar shape directly bonded to a surface of the membrane, including:
disposing a mold on the surface of the membrane;
injecting a second material in a second molten state into the mold, the second molten state having a second fluidity higher than the first fluidity of the first material in the first molten state, while a main material component of the second material being the same as that of the first material; and
solidifying the injected second material into the columnar shape.

5. A diaphragm comprising:
a membrane formed of a first material having chemical resistance; and
a connection portion attached to the membrane and enabling connection of the membrane to another member, the connection portion being formed of a second material, the second material having material properties different from that of the first material while a main material component of the second material being the same as that of the first material,
wherein the membrane and the connection portion are directly bonded together, and
wherein the first material has a first molten state having a first fluidity, and the second material has a second molten state having a second fluidity higher than the first fluidity.

6. The diaphragm according to claim 5, wherein
the main material component is a copolymer of tetrafluoroethylene and perfluoroalkyl vinyl ether;
the second fluidity of the second material in the second molten state allows injection molding of the second material; and
the first material has a flexibility higher than that of the second material.

7. The diaphragm according to claim 5, wherein
the membrane has a thickness of 0.05 mm to 0.5 mm, and
the membrane has a smoothed surface formed by pressing.

8. The diaphragm according to claim 5, wherein the connection portion has a cylindrical shape.

9. A fluid control apparatus comprising:
a diaphragm including:
a membrane formed of a first material having chemical resistance, the membrane being a sheet having a first surface and a second surface with a predetermined uniform thickness; and
a connection portion attached to and directly bonded to the membrane so as to enable connection of the membrane to another member, the connection portion being formed of a second material having material properties different from that of the first material, while a main material component of the second material being the same as that of the first material;
a drive section configured to drive the diaphragm to deform the diaphragms;
a first member configured to press the first surface, the first member including a protrusion having a flat contact surface which comes into contact with the first surface; and
a second member configured to press the second surface, the second member including a counter portion which faces the protrusion such that the membrane is held between the first member and the second member,
wherein a predetermined portion of the membrane pressed between the protrusion and the counter portion is deformed to a thickness approximately half the predetermined thickness, thereby forming a bulge around the predetermined portion, the counter portion having an inclined portion for releasing the bulge.

10. The fluid control apparatus according to claim 9, wherein
the fluid control apparatus is a valve that is configured to open and close a fluid flow path by means of the diaphragm;
the drive section has a reciprocating member which is connected to the connection portion and is configured to be reciprocated;
an annular valve seat is provided around an opening of the flow path in a valve chamber; and
an edge of a contact portion of the valve seat which comes into contact with the diaphragm is smoothly curved.

11. The fluid control apparatus according to claim 9, wherein the fluid control apparatus is a pump that is configured to discharge fluid by utilizing deformation of the diaphragm.

12. The fluid control apparatus according to claim 9, wherein the connection portion has a cylindrical shape.

13. The fluid control apparatus according to claim 9,
wherein the drive section deforms the diaphragm such that a ratio between an amount of deformation of the diaphragm and a diameter of the diaphragm is 0.10 to 0.25.

14. The fluid control apparatus according to claim 9, wherein the main material component is a copolymer of tetrafluoroethylene and perfluoroalkyl vinyl ether, and the second material in a molten state has such a fluidity that allows injection molding of the second material, while the first material has a flexibility higher than that of the second material.

* * * * *